United States Patent
Larkins

(10) Patent No.: US 8,338,751 B2
(45) Date of Patent: Dec. 25, 2012

(54) ADJUSTABLE SPAN FERRIS WHEEL POSITIONER

(75) Inventor: Thomas A. Larkins, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 556 days.

(21) Appl. No.: 12/575,562

(22) Filed: Oct. 8, 2009

(65) Prior Publication Data

US 2011/0084052 A1 Apr. 14, 2011

(51) Int. Cl.
*B23K 26/12* (2006.01)

(52) U.S. Cl. .......................................... 219/136; 269/43

(58) Field of Classification Search ................. 414/733, 414/468.6, 475.1; 409/225; 219/121.86, 219/121.85, 121.6, 136, 159; 269/61, 71, 269/88, 296, 43, 114
See application file for complete search history.

(56) References Cited

U.S. PATENT DOCUMENTS

| | | | | |
|---|---|---|---|---|
| 3,643,935 | A * | 2/1972 | Bell ................................ | 269/16 |
| 3,776,446 | A | 12/1973 | Gage et al. | |
| 3,853,258 | A | 12/1974 | Louw et al. | |
| 3,904,845 | A | 9/1975 | Minkiewicz | |
| 3,977,662 | A * | 8/1976 | Cook .............................. | 269/60 |
| 4,014,495 | A | 3/1977 | Oda et al. | |
| 4,221,319 | A | 9/1980 | Paice | |
| 4,229,642 | A | 10/1980 | Sakurai et al. | |
| 4,343,981 | A | 8/1982 | Connolly | |
| 4,588,872 | A | 5/1986 | Bollinger et al. | |
| 4,852,748 | A | 8/1989 | Burgess et al. | |
| 4,879,448 | A | 11/1989 | Folger et al. | |
| 5,658,476 | A * | 8/1997 | Gullo et al. ............... | 219/121.86 |
| 5,873,569 | A | 2/1999 | Boyd et al. | |
| 6,147,323 | A * | 11/2000 | Erickson et al. ......... | 219/121.86 |
| 6,264,418 | B1 * | 7/2001 | Michael et al. ............... | 414/733 |
| 6,347,733 | B1 * | 2/2002 | Hickey, II .................... | 228/49.1 |
| 6,450,490 | B1 | 9/2002 | Mangelsen et al. | |
| 6,921,011 | B1 | 7/2005 | Mangelsen et al. | |
| 7,172,376 | B1 * | 2/2007 | Jagtap et al. ................... | 409/225 |
| 2004/0056400 | A1 * | 3/2004 | Ghuman et al. ................ | 269/71 |
| 2006/0242818 | A1 * | 11/2006 | Penick et al. ................... | 29/560 |
| 2008/0046120 | A1 | 2/2008 | Mangelsen et al. | |

OTHER PUBLICATIONS

"Versa 4M Complete Robotic Welding Workcell," http://web.archive.org/web/20061018103923/http://www.genesis-systems.com/workcell_details.cfm?id=16, published Oct. 18, 2006.
"Welding Lathe handles small, round parts." http://news.thomasnet.com/fullstory/451984, published May 25, 2004.

* cited by examiner

*Primary Examiner* — Steven Loke
*Assistant Examiner* — David Goodwin
(74) *Attorney, Agent, or Firm* — Benesch, Friedlander, Coplan & Aronoff LLP

(57) ABSTRACT

A ferris wheel workpiece positioner may include a base and a workpiece holder operatively connected to the base and configured to be rotated about a central axis. The ferris wheel workpiece positioner may also include a first-side set of rails operatively connected to a first side of the workpiece holder and a second-side set of rails operatively connected to a second side of the workpiece holder. The ferris wheel workpiece positioner may further include a first-side set of workpiece supports including at least one first-side support operatively connected to the first-side set of rails, and a second-side set of workpiece supports including at least one second-side support operatively connected to the second-side set of rails.

20 Claims, 3 Drawing Sheets

ADJUSTABLE SPAN FERRIS WHEEL POSITIONER

FIELD OF INVENTION

The present application relates to a positioner for an arc welding system. More particularly, the present application relates to a ferris wheel type positioner with an adjustable span.

BACKGROUND

A ferris wheel positioner generally has a frame with two sets of supports, one set on each side of the frame. Each set of supports holds a workpiece in the span between the supports. Thus, each workpiece can be rotated about a horizontal axis independently of the other workpiece, while the frame can also be rotated about a horizontal axis. A workpiece may also be attached to a fixture, and the fixture held by the supports.

SUMMARY

A ferris wheel workpiece positioner may include a base and a workpiece holder operatively connected to the base and configured to be rotated about a central axis. The ferris wheel workpiece positioner may also include a first-side set of rails disposed on a first side of the workpiece holder and a second-side set of rails disposed on a second side of the workpiece holder. The ferris wheel workpiece positioner may further include a first-side set of workpiece supports including at least one first-side support operatively connected to the first-side set of rails, and a second-side set of workpiece supports including at least one second-side support operatively connected to the second-side set of rails.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1:
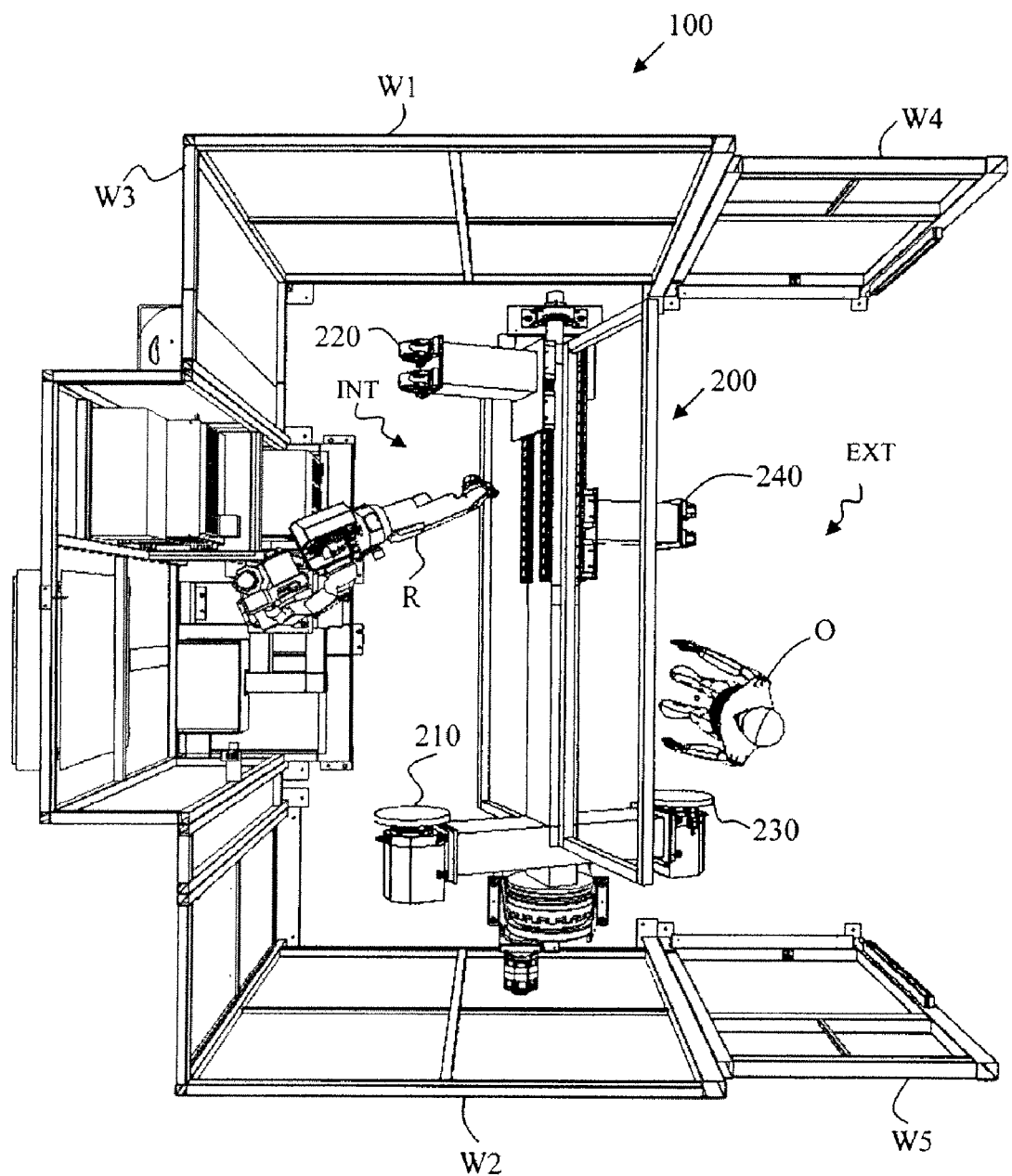
FIG. 1 is a top plan view of an exemplary work station including one embodiment of an adjustable span ferris wheel positioner.

FIG. 1 is a top plan view of an exemplary work station 100 including one embodiment of an adjustable span ferris wheel positioner 200 located within the work station 100. In the illustrated embodiment, the walls W1, W2, and W3 of the work station 100 together with a first side of the positioner 200 define an interior work area INT. The remaining walls W4 and W5 together with a second side of the positioner 200 form an exterior work area EXT. It should be understood, however, that the positioner 200 may be employed on a work station having any number of walls or doors and any number of work areas. The positioner 200 may also be employed by itself and not in connection with any walls or work areas.

In the illustrated embodiment, the work station 100 is an automated welding station. Welding is performed inside the interior work area INT by a robot R, and preparation for welding is performed in the exterior work area EXT by an operator O. The operator O may be a human or a robot (not shown). However, it should be understood that the positioner 200 is not limited to use in a welding environment.

In the interior work area INT, the robot R may perform work on a workpiece (not shown) held by a headstock 210 and a tailstock 220 on the first side of positioner 200. In one embodiment, the headstock 210 and the tailstock 220 directly hold the workpiece. In an alternative embodiment, the workpiece is secured to a fixture (not shown) and the fixture is held by the headstock 210 and the tailstock 220. The workpiece may rotate about an axis common o the headstock 210 and the tailstock 220.

In the exterior work area EXT, an operator O may remove a completed workpiece (not shown) held by a headstock 230 and a tailstock 240 on the second side of positioner 200. The operator may also install a workpiece to be welded (not shown). The workpiece may be secured to a fixture (not shown). The workpiece may rotate about an axis common to the headstock 230 and the tailstock 240.

Figure 2:
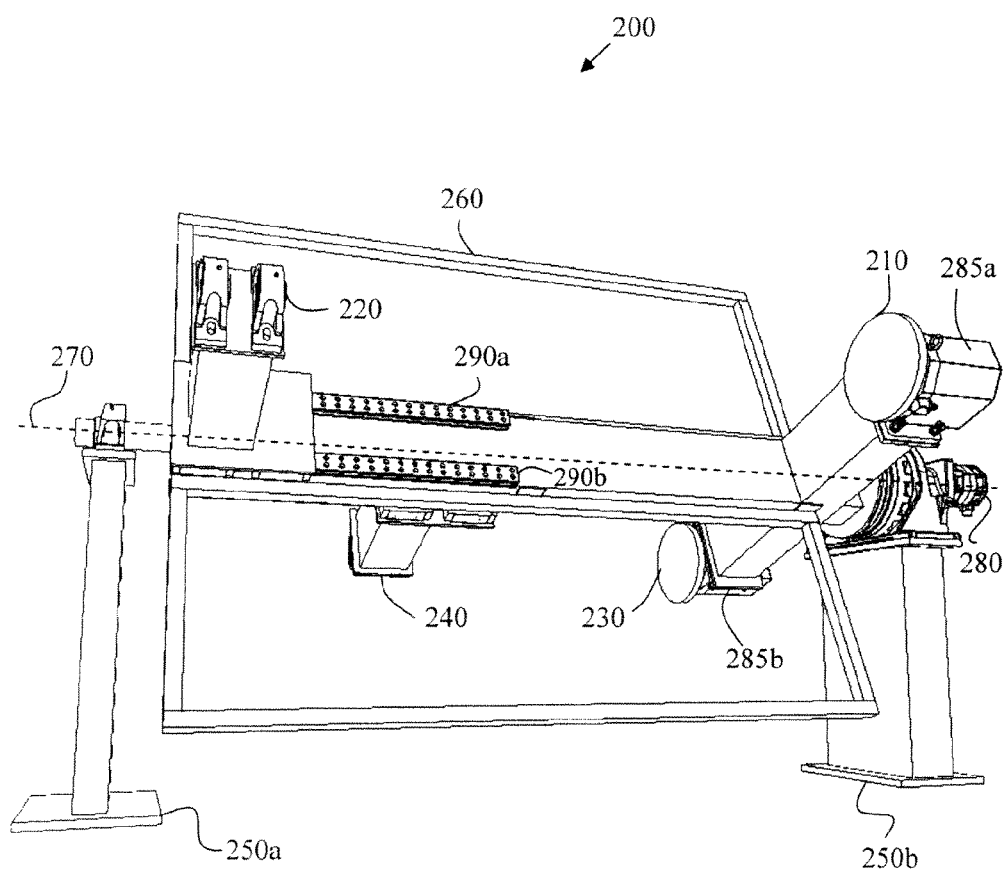
FIG. 2 illustrates a perspective view of a first side of an example adjustable span ferris wheel positioner.
Figure 3:
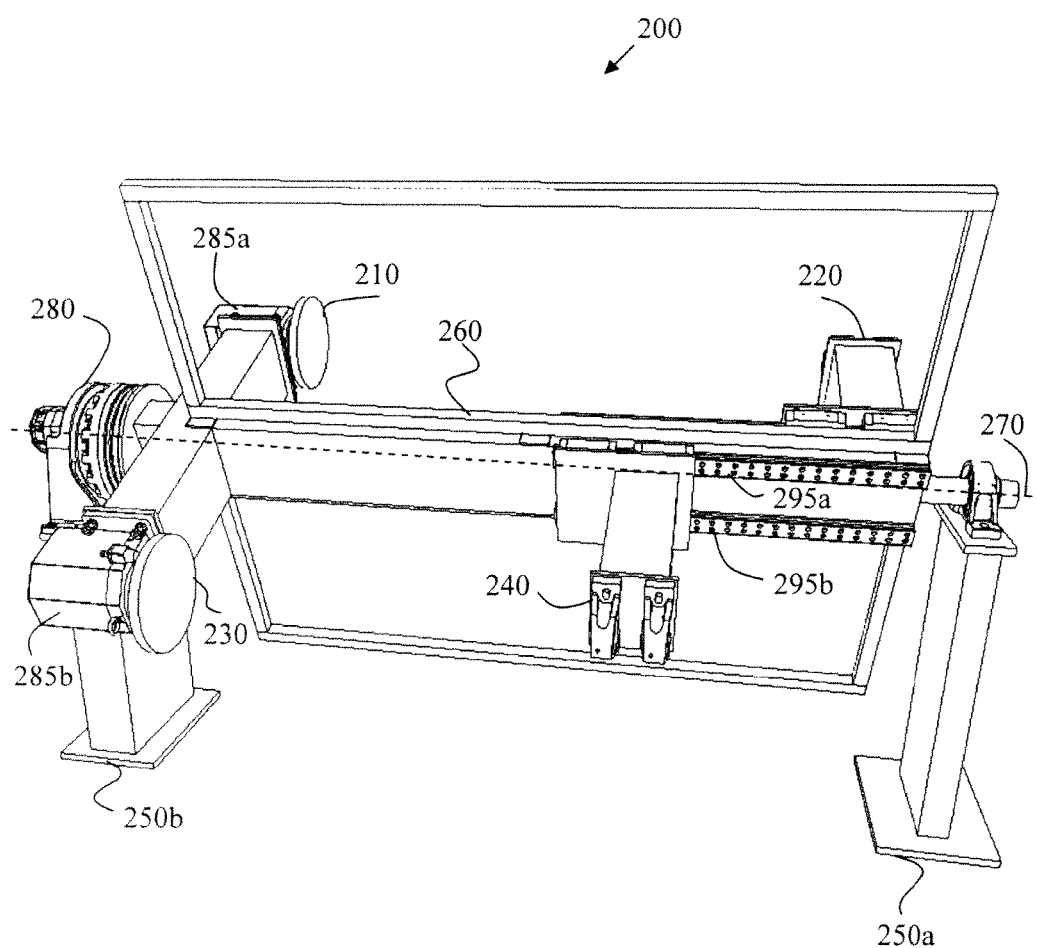
FIG. 3 illustrates a perspective view of a second side of an example adjustable span ferris wheel positioner.

FIGS. 2 and 3 illustrate different views of one embodiment of the positioner 200. Specifically, FIG. 2 illustrates a perspective view of the first side of the positioner 200, while FIG. 3 illustrates a perspective view of the second side of the positioner 200.

With reference to FIG. 2, the positioner 200 may include at least one base. In the illustrated embodiment, two bases 250a and 250b are shown. The bases 250a and 250h support positioner 200 off the floor. In alternative embodiments, the at least one base may support positioner 200 off workstation walls, off a ceiling, and so on. The positioner 200 may also include a frame or workpiece holder 260. The workpiece holder 260 has two sides: a first side and a second side. One or more shields (not shown) may be disposed on workpiece holder 260 to, for example, protect an operator loading or unloading a workpiece to one side of the workpiece holder 260 from the welding arc of a robot welding on the other side.

The workpiece holder 260 is operatively connected to the bases 250a-b and configured to be rotated about a central axis 270. The workpiece holder 260 rotates about the central axis 270 to expose one side of workpiece holder 260 to an interior work area where a robot may perform work and to expose the other side of workpiece holder 260 to an exterior work area where an operator may perform work. In the illustrated embodiment, workpiece holder 260 is rotated by a motor 280 operatively connected to the base 250b and operatively connected to the workpiece holder 260. A motor 285a may independently rotate a workpiece (not shown) held on one side of workpiece holder 260 about an axis common to headstock 210 and tailstock 220. A workpiece (not shown) held on the other side of workpiece holder 260 may be independently rotated about an axis common to headstock 230 and tailstock 240 by a motor 285b.

The exemplary positioner 200 may also include a first-side set of linear ways or rails 290a-b. The rails 290a-b are attached to the first side of the workpiece holder 260. In an alternative embodiment (not shown), the linear ways or rails 290a-b are integrally formed within workpiece holder 260.

The positioner 200 may also include a first-side set of workpiece supports, In the illustrated embodiment, the first-side set of workpiece supports includes the headstock 210 and the tailstock 220. In one embodiment, the workpiece is rotated about an axis common to headstock 210 and tailstock 220 by the motor 285a operatively connected to the headstock 210. At least one of the first-side workpiece supports is slidably connected to the rails 290a-b such that the workpiece support may slide along the rails 290a-b. In the illustrated embodiment, the tailstock 220 is slidably connected to the rails 290a-b such that the tailstock 220 may slide along the rails 290a-b. The tailstock 220 may be adjustably positioned along the full span or workpiece holding width of the first side of the workpiece holder 260, such that different length workpieces or fixtures may be held by the positioner 200.

The positioner 200 may include a conventional locking mechanism configured to lock in place the support connected to the rails 290a-b. In one embodiment (not shown), the tailstock 220 includes a locking mechanism to lock it in a desired position along the first-side set of rails 290a-b. Thus an operator may secure one end of a workpiece to the headstock 210, slide the tailstock 220 to a proper position to secure the opposite end of the workpiece and lock the tailstock 220 in place via the locking mechanism.

The locking mechanism could be one or a combination of various known in the art (e.g. pull pin, hand crank, rack and pinion combination, pneumatic tail stock advance system, motor driven tail stock advance system, clamp, screw, bolt, and so on). In one embodiment, the locking mechanism may be a pull pin (not shown). In this embodiment, the rail 290a or the rail 290b may have holes disposed along their length for the pull pin to engage. In an alternative embodiment, the locking mechanism may be a hand crank with positive interface (not shown). In this embodiment, once the tailstock 220 is at a desired position along the rails 290a-b, the tailstock 220 may be held in place by pressure exerted against the tailstock 220, the workpiece holder 260 or some other surface.

In an alternative embodiment, a second workpiece support from the first-side workpiece supports may be operatively connected to the rails 290a-b such that the second workpiece support slides along the rails 290a-b. For example, both the headstock 210 and the tailstock 220 may be operatively connected to the rails 290a-b such that both the headstock 210 and the tailstock 220 may slide along the rails 290a-b.

In an alternative embodiment, the positioner 200 may include a second set of rails on the first side (not shown). The second first-side set of rails may be operatively connected to the first side of the workpiece holder 260. A rearward workpiece support from the first-side workpiece supports may be operatively connected to the second first-side rails such that the rearward workpiece support slides along the rails while a forward workpiece support operatively connected to rails 290a-b slides along rails 290a-b or vice versa. For example, the tailstock 220 may be slidably engaged to the rails 290a-b while the headstock 210 may be slidably engaged to the second first-side set of rails such that the tailstock 220 may slide along the rails 290a-b while the headstock 210 may slide along the second first-side set of rails.

With reference to FIG. 3, the example positioner 200 includes a second set of linear ways or rails 295a-b. The rails 295a-b are operatively connected to the second side of the workpiece holder 260. In one embodiment, rails 295a-b are integrally formed with workpiece holder 260 such that the rails or linear ways are not installed or attached to workpiece holder 260 but are a part of it.

The positioner 200 may also include workpiece supports on the second side of the workpiece holder 260. In the illustrated embodiment, the second-side workpiece supports include the headstock 230 and the tailstock 240. In one embodiment, the workpiece is rotated about an axis common to headstock 230 and tailstock 240 by the motor 285b operatively connected to the headstock 230. At least one of the supports on the second side of workpiece holder 260 is operatively connected to the second set of rails 295a-b such that the workpiece support may slide along the rails 295a-b. In the illustrated embodiment, the tailstock 240 is slidably engaged to rails 295a-b such that the tailstock 240 may slide along rails 295a-b. The tailstock 240 may be adjustably positioned along the full span or workpiece holding width of the second side of the workpiece holder 260, such that different lengths of workpieces or fixtures may be held by the positioner 200.

As on the first side, the second side of positioner 200 may include a conventional locking mechanism configured to lock in place the support connected to the rails 295a-b. In one embodiment (not shown), the tailstock 240 includes a locking mechanism to lock it in a desired position along the first-side set of rails 295a-b. Thus, an operator may secure one end of a workpiece to the headstock 230, slide the tailstock 240 to a proper position to secure the opposite end of the workpiece and lock the tailstock 240 in place via the locking mechanism.

The locking mechanism could be one or a combination of various known in the art (e.g. pull pin, hand crank, rack and pinion combination, pneumatic tail stock advance system, motor driven tail stock advance system, clamp, screw, bolt, and so on). In one embodiment, the locking mechanism may be a pull pin (not shown). In this embodiment, the rail 295a or the rail 295b may have holes along their surface for the pull pin to engage. In an alternative embodiment, the locking mechanism may be a hand crank with positive interface (not shown). In this embodiment, once the tailstock 240 is at a desired position along the rails 295a-b, the tailstock 240 may be held in place by pressure exerted against the tailstock 240, the workpiece holder 260 or some other surface.

In one embodiment, a second workpiece support from the second-side workpiece supports may be operatively connected to the rails 295a-b such that the second workpiece support slides along the rails 295a-b. For example, both the headstock 230 and the tailstock 240 may be slidably engaged to the rails 295a-b such that both the headstock 230 and the tailstock 240 to slide along the rails 295a-b.

In one embodiment, the example positioner 200 may include a second set of rails on the second side (not shown). The second second-side set of rails may be operatively connected to the second side of the workpiece holder 260. A rearward workpiece support from the second-side workpiece supports may be operatively connected to the second second-side rails such that the rearward workpiece support slides along the second second-side rails while a forward workpiece support operatively connected to rails 295a-b slides along rails 295a-b or vice versa. For example, the tailstock 240 may be slidably engaged the to rails 295a-b, while the headstock 230 may be slidably engaged to the second second-side set of rails such that the tailstock 240 may slide along rails 295a-b, while the headstock 230 may slide along the second second-side set of rails.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A ferris wheel workpiece positioner comprising:
    a base;
    a workpiece holder operatively connected to the base and configured to be rotated about a central axis;
    a first-side set of rails operatively connected to a first side of the workpiece holder;
    a second-side set of rails operatively connected to a second side of the workpiece holder;
    a first-side set of workpiece supports including at least two first-side supports, including a first-side forward support operatively connected to the first-side set of rails such that the first-side forward support slides along the first-side set of rails, and a first-side rearward support operatively connected to the first-side set of rails such that the first-side rearward support slides along the first-side set of rails; and
    a second-side set of workpiece supports including at least one second-side support operatively connected to the second-side set of rails such that the at least one second-side support slides along the second-side set of rails.

2. The ferris wheel workpiece positioner of claim 1, where the second-side set of workpiece supports includes at least two second-side supports, including a second-side forward support operatively connected to the second-side set of rails such that the second-side forward support slides along the second-side set of rails and a second-side reward support operatively connected to the second-side set of rails such that the second-side reward support slides along the second-side set of rails.

3. The ferris wheel workpiece positioner of claim 1, comprising a locking mechanism configured to lock the at least one first-side support to a fixed position along the first-side set of rails.

4. The ferris wheel workpiece positioner of claim 3, where the locking mechanism is selected from the group consisting of a pull pin, a quick release pull pin, a hand crank, a rack and pinion combination, a pneumatic tail stock advance system, a motor driven tail stock advance system, a clamp, a screw, and a bolt.

5. The ferris wheel workpiece positioner of claim 1, comprising a locking mechanism configured to lock the at least one second-side support to a fixed position along the second-side set of rails.

6. The ferris wheel workpiece positioner of claim 5, where the locking mechanism is selected from the group consisting of a pull pin, a quick release pull pin, a hand crank, a rack and pinion combination, a pneumatic tail stock advance system, a motor driven tail stock advance system, a clamp, a screw, and a bolt.

7. A welding apparatus comprising:
    a workpiece fixture holder configured to secure a first workpiece fixture to a first-side of the workpiece fixture holder and a second workpiece fixture to a second-side of the workpiece fixture holder, where the workpiece fixture holder is configured to rotate about an axis of rotation, the workpiece fixture holder including:
        at least one first-side rail disposed on the first side of the workpiece fixture holder and parallel to the axis of rotation;
        at least one second-side rail disposed on the second side of the workpiece fixture holder and parallel to the axis of rotation;
        a first-side tail stock slidably engaged to the at least one first-side rail; and
        a second-side tail stock slidably engaged to the at least one second-side rail.

8. The welding apparatus of claim 7, comprising a first-side head stock slidably engaged to the at least one first-side rail.

9. The welding apparatus of claim 8, comprising a second-side head stock slidably engaged to the at least one second-side rail.

10. The welding apparatus of claim 7, comprising a second first-side rail disposed on the first side of the workpiece fixture holder and a first-side headstock slidably engaged to the second first-side rail.

11. The welding apparatus of claim 10, comprising a second second-side rail disposed on the second side of the workpiece fixture holder and a second-side headstock slidably engaged to the second second-side rail.

12. The welding apparatus of claim 7, comprising locking means for locking the first-side tail stock to a fixed position along the at least one first-side rail.

13. The welding apparatus of claim 7, comprising locking means for locking the second-side tail stock to a fixed position along the at least one second-side rail.

14. The ferris wheel workpiece positioner of claim 1, wherein the first-side set of rails are substantially parallel to the central axis, and wherein the second-side set of rails are substantially parallel to the central axis.

15. A robotic welding system comprising:
    a workpiece fixture holder having a rotational axis, the workpiece fixture holder including:
        a first head stock disposed on a first side of the workpiece fixture,
        means for sliding the first head stock in a direction parallel to the axis of rotation,
        a first tail stock disposed on the first side of the workpiece fixture,
        a second head stock disposed on a second side of the workpiece fixture,
        means for sliding the second head stock in a direction parallel to the axis of rotation, and
        a second tail stock disposed on the second side of the workpiece fixture; and
    means for rotating the workpiece fixture holder about the rotational axis.

16. The robotic welding system of claim 15, further comprising means for locking the first head stock to a fixed position.

17. The robotic welding system of claim 15, further comprising means for sliding the first tail stock in a direction parallel to the axis of rotation.

18. The robotic welding system of claim 17, further comprising means for locking the first tail stock to a fixed position.

19. The robotic welding system of claim 15, further comprising means for locking the second head stock to a fixed position.

20. The robotic welding system of claim 15, further comprising means for sliding the second tail stock in a direction parallel to the axis of rotation, and means for locking the second tail stock to a fixed position.

* * * * *